Feb. 9, 1954    J. B. SEED    2,668,598
APPARATUS FOR REMOVING GASES FROM A LIQUID
Filed Sept. 26, 1950

INVENTOR:
John Bryan Seed,
BY Cushman, Darby & Cushman
ATTORNEYS

Patented Feb. 9, 1954

2,668,598

UNITED STATES PATENT OFFICE 2,668,598

APPARATUS FOR REMOVING GASES FROM A LIQUID

John Bryan Seed, West Kilbride, Scotland, assignor to Imperial Chemical Industries Limited, a corporation of Great Britain Application September 26, 1950, Serial No. 186,752

Claims priority, application Great Britain November 21, 1949

2 Claims. (Cl. 183—2.5)

The present invention relates to an apparatus for removing gases from a liquid.

The said gases may be dissolved or entrained or included as by stirring or mixing in said liquid. The liquid may be a solution, a suspension or an emulsion.

One way of removing gas from a liquid is to enclose the liquid in a vessel and to exhaust the upper part of the vessel with a vacuum pump whereby gas bubbles are caused to rise to the surface and are withdrawn by the continuous suction of the vacuum pump. The rate of gas removal from the lower parts of the liquid is however very slow and it is found that when viscous liquids are employed the rate of removal is so slow as to be impracticable. An improved procedure is to expose the liquid in shallow layers or thin films to an exhausting operation. This procedure increases the rate of degasification but when the liquid or suspension is very viscous as for instance a viscous aqueous alkaline solution of a vegetable globulin adapted for conversion into filamentary products or an aqueous suspension of precipitated protein, the production of said shallow layers or thin films cannot be easily accomplished.

The object of the present invention is to provide apparatus particularly adapted to enable a viscous liquid to be completely degasified in a very short time.

According to the present invention the method of removing gases from a liquid comprises delivering the liquid as droplets into a confined space which is kept at sub-atmospheric pressure, permitting the droplets to form into a thin flowing liquid film along the confines of said space, delivering the liquid film into a restricted region in said space to form a bulk of liquid in said region, and removing from said region liquid from which the gases have been thus removed.

Apparatus for removing gas from a liquid in accordance with one embodiment of the invention comprises in association a tall closed vessel adapted to be kept at sub-atmospheric pressure, and a sprayer within said vessel adapted to discharge liquid as droplets in a direction of the upper regions of the surrounding walls of said vessel and to form a thin film of liquid on said walls, said walls being so inclined as to permit said thin film of liquid to flow by gravity into a collecting region for said liquid within said vessel.

Figure 1:
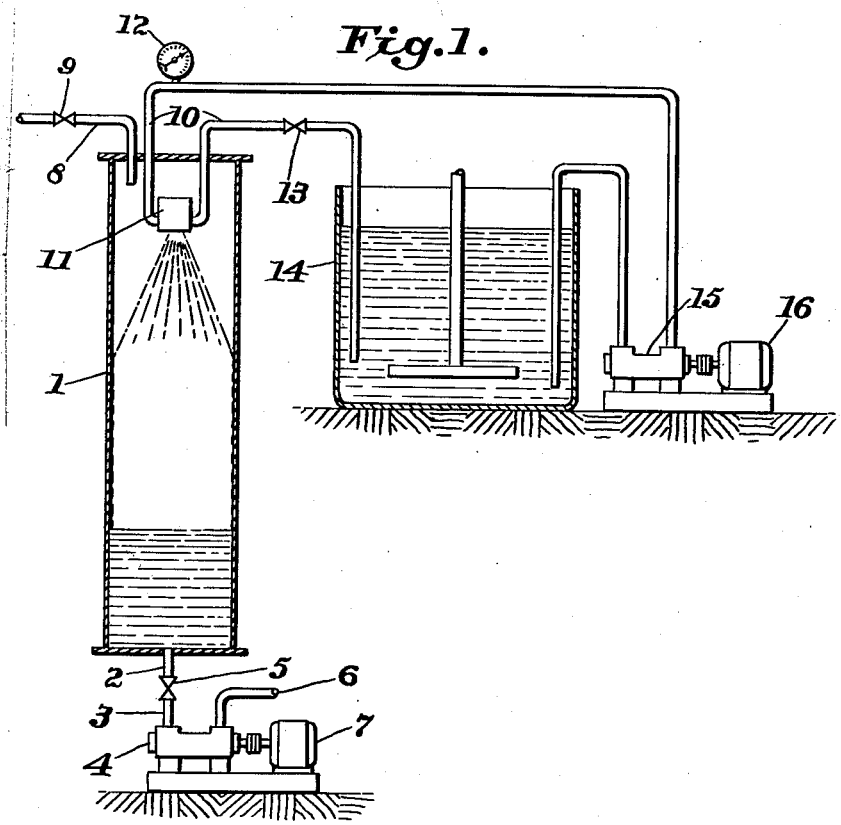
Figure 2:
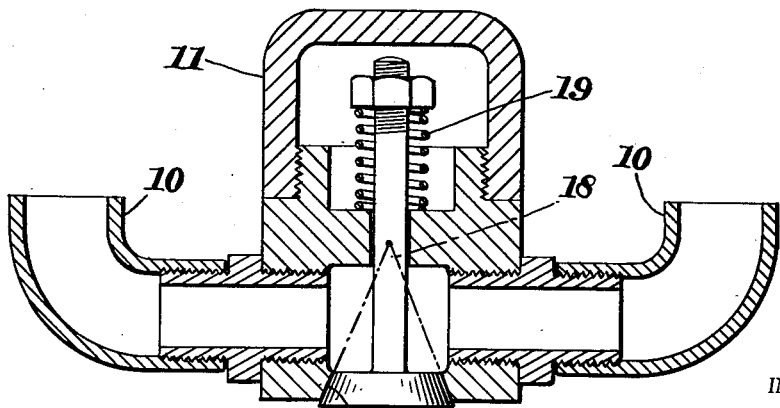

The invention is illustrated by the following example and with reference to the diagrammatic drawings accompanying the specification in which Fig. 1 is a sectional elevation of apparatus suitable for carrying out the invention and Fig. 2 is an enlarged section of the sprayer shown in Fig. 1.

Example

In Fig. 1, 1 is a tall vertical cylindrical vessel of appreciably greater height than diameter in which degasification takes place. It can be made of any material which will withstand the external pressure of the atmosphere when the pressure within the vessel is sub-atmospheric. The material is preferably one which is not corroded or attacked by the liquid to be degasified. The material may be for instance transparent "Perspex" or stainless steel. The outlet 2 at the bottom of the vessel 1 is connected to the suction end 3 of a pump 4 through a valve 5 for discharging the degasified liquid through the discharging end 6. The pump 4 is driven by the motor 7. At the top of the vessel 1 is a pipe 8 connected to an exhauster pump (not shown) through valve 9 and two connecting pipes 10 for the sprayer valve 11, one admitting liquid to the valve 11 and one permitting return of the excess liquid. The liquid pressure employed is 45 lbs. per square inch gauge, but this can be varied as desired. The pressure in the sprayer valve 11 is indicated by the pressure gauge 12. The valve 13 is to adjust the pressure in the sprayer valve 11 and thereby the rate of throughput and quality of the spray.

The method of degasification of a liquid is as follows: The valve 5 is closed and the vessel 1 is exhausted by opening valve 9. The liquid to be treated is contained in the vessel 14 to which is connected a pump 15 driven by a motor 16. Valve 13 is opened and the pump 15 is started so that circulation of the liquid commences. If the liquid is a suspension homogenization is promoted. The valve 13 is then partially closed until the quality of the conical jet which commences from the sprayer valve 11 is such that complete break-up into fine droplets is obtained. The spray cone impinges on the walls of the containing vessel 1 at a distance below the sprayer valve 11 and the liquid continues to flow downwards as a thin film. When sufficient body of degasified liquid has gathered in the foot of the vessel 1 the discharge pump 4 is started.

The degasification operation occurs during the discharge of the spray from the sprayer valve 11 to the walls of the vessel 1 and continues during the flow of the liquid in film form down the wall of the vessel 1.

Referring to Fig. 2, 17 is a mitred seat such that the included angle 18 is of the order of 45° and which opens against the spring load 19 downwards due to the liquid pressure in the sprayer valve. The discharge of the liquid across the valve body is such that stagnant pockets are not formed and hence sedimentation of suspension cannot occur to cause clogging of the valve 11.

The invention has been found particularly useful for the removal of gases from aqueous suspensions of vegetable globulins and from viscous aqueous alkaline solutions of vegetable globulins.

What I claim is:

1. Apparatus for removing gases from a liquid comprising a closed vessel of substantially greater height than width adapted to be maintained at sub-atmospheric pressure, a liquid spray distributor within said vessel adapted to discharge liquid downwardly in the form of a cone of droplets and in the direction of the upper regions of the surrounding wall of said vessel to form a thin film of liquid on said wall, said surrounding wall being inclined so as to permit said thin film of liquid to flow by gravity to the bottom of said vessel for collection, and a supply reservoir for providing liquid to said liquid spray distributor, said liquid spray distributor comprising a body member having a liquid inlet means and a distributor discharge means, said distributor discharge means including a valve member which is maintained in a normally closed position by spring urged means and opens in response to a predetermined liquid pressure on said valve, said liquid spray distributor including an outlet from the body portion thereof for returning liquid to said supply reservoir, said outlet having valve means for controlling the rate of return of said liquid to said supply reservoir and thereby adjust the pressure of liquid acting against said spring normally urging said valve in a closed position whereby control of the droplet formation is obtained.

2. Apparatus for removing gases from a liquid as recited in claim 1 in which said valve member is seated on a mitered seating the sloping wall of which is a frusto-conical portion of a cone having an apex of an angle of substantially 45 degrees.

JOHN BRYAN SEED.

References Cited in the file of this patent

UNITED STATES PATENTS

| Number | Name | Date |
|---|---|---|
| 1,853,235 | Scott | Apr. 12, 1932 |
| 1,910,088 | Cherry | May 23, 1933 |
| 2,355,057 | Copeland | Aug. 8, 1944 |
| 2,408,021 | Hill | Sept. 24, 1946 |
| 2,555,803 | Mashinter et al. | June 5, 1951 |